United States Patent
Robinson et al.

(10) Patent No.: US 11,558,810 B2
(45) Date of Patent: Jan. 17, 2023

(54) ARTIFICIAL INTELLIGENCE RADIO CLASSIFIER AND IDENTIFIER

(71) Applicant: BAE SYSTEMS Information and Electronic Systems Integration Inc., Nashua, NH (US)

(72) Inventors: Joshua W. Robinson, Durham, NC (US); Joseph M. Carmack, Milford, NH (US); Scott A Kuzdeba, Hollis, NH (US); James M. Stankowicz, Jr., Boston, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 255 days.

(21) Appl. No.: 17/142,800

(22) Filed: Jan. 6, 2021

(65) Prior Publication Data
US 2022/0217619 A1 Jul. 7, 2022

(51) Int. Cl.
*H04W 48/16* (2009.01)
*G06N 20/00* (2019.01)

(52) U.S. Cl.
CPC ............ *H04W 48/16* (2013.01); *G06N 20/00* (2019.01)

(58) Field of Classification Search
CPC .............................. H04W 48/16; G06N 20/00
USPC ........................................................ 455/434
See application file for complete search history.

(56) References Cited

U.S. PATENT DOCUMENTS

| | | | |
|---|---|---|---|
| 2019/0356520 A1* | 11/2019 | Silverman | H04L 25/03828 |
| 2020/0007633 A1* | 1/2020 | Kim | H04W 4/20 |
| 2020/0162328 A1* | 5/2020 | Valenza | H04L 41/0886 |
| 2021/0048507 A1 | 2/2021 | Kuzdeba et al. | |

OTHER PUBLICATIONS

O'Shea T. & Hoydis J. "An introduction to deep learning for the physical layer," IEEE Transactions on Cognitive Communications and Networking, vol. 3, No. 4, pp. 563-575, 2017.
Wong, L.J. et al. "The rfml ecosystem: A look at the unique challenges of applying deep learning to radio frequency applications," arXiv preprint arXiv:2010.00432, 2020.
Dorner, S. et al. "Deep learning based communication over the air," IEEE Journal of Selected Topics in Signal Processing, vol. 12, No. 1, pp. 132-143, 2017.

(Continued)

*Primary Examiner* — Thomas J Lett
(74) *Attorney, Agent, or Firm* — Maine Cernota & Rardin

(57) ABSTRACT

A system whereby individual RF emitter devices are distinguished in real-world environments through deep-learning comprising an RF receiver for receiving RF signals from a plurality of individual devices; a preprocessor configured to produce complex-valued In-phase (I) and Quadrature (Q) IQ signal sample representations; a two-stage Augmented Dilated Causal Convolution (ADCC) network comprising a stack of dilated causal convolution layers and traditional convolutional layers configured to process I and Q components of the complex IQ samples; transfer learning comprising a classifier and a cluster embedding dense layer; unsupervised clustering whereby the RF signals are grouped according to a device that transmitted the RF signal; and an output identifying the individual RF emitter device whereby the individual RF emitter device is distinguished in the real-world environment.

20 Claims, 10 Drawing Sheets

SYSTEM COMPONENTS

(56) References Cited

OTHER PUBLICATIONS

Ye, Hao et al. "Channel agnostic end-to-end learning based communication systems with conditional gan," in 2018 IEEE Globecom Workshops (GC Wkshps). IEEE, 2018, pp. 1-5.
Engel, J. et al "DDSP: Differentiable digital signal processing," arXiv preprint arXiv:2001.04643, 2020.
Mun, J. et al. "A deep learning approach for automotive radar interference mitigation," in 2018 IEEE 88th Vehicular Technology Conference (VTC-Fall). IEEE, 2018, pp. 1-5.
Zhou, Y. et al. "Deep learning interference cancellation in wireless networks," arXiv preprint arXiv:2009.05533, 2020.
Ninkovic, V. et al. "Deep learning based packet detection and carrier frequency offset estimation in IEEE 802.11 ah," arXiv preprint arXiv:2004.11716, 2020.
Dreifuerst, R. et al. "Deep learning-based carrier frequency offset estimation with one-bit adcs," in 2020 IEEE 21st International Workshop on Signal Processing Advances in Wireless Communications (SPAWC). IEEE, 2020, pp. 1-5.
J. Robinson, S. Kuzdeba, J. Stankowicz and J. M. Carmack, "Dilated Causal Convolutional Model For RF Fingerprinting," 2020 10th Annual Computing and Communication Workshop and Conference (CCWC), Las Vegas, NV, USA, 2020, pp. 0157-0162, doi: 10.1109/CCWC47524.2020.9031257. Presented on Jan. 6, 2020.
J. Robinson and S. Kuzdeba, "RiftNet: Radio Frequency Classification for Large Populations," IEEE Consumer Communications & Networking Conference (CCNC), Las Vegas, NV, USA, 2021. Presented on Jan. 10, 2021.
J. Robinson and S. Kuzdeba, "Novel device detection using RF fingerprints," 2021 11th Annual Computing and Communication Workshop and Conference (CCWC), Las Vegas, NV, USA, 2021. Presented on Jan. 28, 2021.
S. Kuzdeba, J. Robinson and J. Carmack, "Transfer Learning with Radio Frequency Signals," 3rd International Workshop on Security Trust and Privacy for Emerging Cyber Physical Systems (STP-CPS'21) as part of IEEE Consumer Communications & Networking Conference (CCNC), Las Vegas, NV, USA, 2021 Presented on Jan. 12, 2021.
J. Stankowicz and S. Kuzdeba, "Unsupervised Emitter Clustering through Deep Manifold Learning," 2021 11th Annual Computing and Communication Workshop and Conference (CCWC), Las Vegas, NV, USA, 2021. Presented on Jan. 28, 2021.
Oord, Aaron Van Den, et al. "WaveNet: A Generative Model for Raw Audio", Google DeepMind, London, UK. Sep. 19, 2016.
J. M. Carmack and S. Kuzdeba, "RiftNet Reconstruction Model for Radio Frequency Domain Waveform Representation and Synthesis," Conf. May 10-13, 2021; Pub. Jun. 21, 2021, 2021 IEEE World AI IoT Congress (AIIoT), 2021, pp. 0303-0312, doi: 10.1109/AIIoT52608.2021.9454242.

* cited by examiner

INTERNET OF EVERYTHING SIGNALS ENVIRONMENT

SYSTEM COMPONENTS

SYSTEM ARCHITECTURE

400

ARCHITECTURE GDCC DETAILS

ARCHITECTURE EMBODIMENT DETAILS

MULTI-BURST AND MACH EMBODIMENTS

PREPROCESSING

TRAINING AND UNSUPERVISED CLUSTERING

METHOD

KKCS, KUCS, AND UUCS ON 2D MANIFOLD

ARTIFICIAL INTELLIGENCE RADIO CLASSIFIER AND IDENTIFIER

STATEMENT OF GOVERNMENT INTEREST

Portions of the present invention may have been made pursuant to Contract Number FA8750-18-C-0150 awarded by the U.S. Air Force. The United States Government has certain rights in the inventions.

FIELD

The following disclosure relates generally to distinguishing RF transmitters and, more particularly, to an Artificial Intelligence Radio Classifier and Identifier system whereby individual RF emitter devices are distinguished in real-world environments through deep-learning.

BACKGROUND

The density of wireless devices is rapidly growing, exacerbated by the increasing number of smart devices connecting to the Internet of Things (IoT)/Internet of Everything (IoE). The current roll-out of 5G networks may lead to over 1 million devices per square kilometer in some urban areas. While the technology for effectively utilizing the spectrum to support so many devices has rapidly improved, the security of connected devices has not. Cyber criminals are increasingly capable of taking advantage of poorly designed security systems, allowing spoofing attacks where third-party devices effectively impersonate a trusted device. The effectiveness of spoofing attacks would be greatly diminished if security protocols could identify devices by characteristics that were hard to impersonate.

Any security protocol defined purely in software or firmware is potentially vulnerable; however, hardware-specific differences between devices cannot be easily impersonated. Even when devices are assembled in the same factory, subtle manufacturing variations in their components impart unique fingerprints to their transmitted waveforms, which can be used to uniquely distinguish them. Traditional RF fingerprinting approaches utilize expert-defined features based on physical properties of RF signals, such as IQ drift and frequency offsets. These approaches have typically been limited to a small number of devices (<100) and tend to be protocol specific or exist in highly constrained environments.

Unlike image classification tasks, which have had many years of research to improve and standardize datasets and preprocessing techniques, many characteristics of RF data make it a particularly complex domain. Various environmental effects can affect signals, often more significantly than the device specific hardware variations that embodiments identify. Signals may be transmitted and recorded at different frequencies and different sample rates and may have vastly different lengths. Additionally, fingerprinting is not like a normal classification task which may have significant variations in classes (e.g. elephant vs. zebra). Wireless devices are designed and constrained to transmit a particular protocol, with the explicit goal of not appearing distinct from similar devices. An analogy in the imagery domain is distinguishing individual black cars in a set of images of many different black cars each captured at different angles with different backgrounds using different cameras. In addition, the vehicles are all the same make and model and only subtle blemishes that differ on each vehicle to aid in identification.

What is needed is a system and method to distinguish between individual RF emitters in complex real-world environments, with a large number of distinct emitters.

SUMMARY

An embodiment provides a system whereby individual RF emitter devices are individually identified through deep-learning comprising an RF receiver for receiving RF signals from a plurality of individual RF emitter devices; a preprocessor configured to produce complex-valued In-phase (I) and Quadrature (Q) IQ signal sample representations from the RF signals; a two-stage Augmented Dilated Causal Convolution (ADCC) network comprising stacks of dilated causal convolution layers and traditional convolutional layers configured to process I and Q components of the complex IQ sample representations; concatenating the two-stages; and an output from the two concatenated stages identifying the individual RF emitter devices whereby the individual RF emitter devices are individually identified. In embodiments the preprocessor is configured to further preprocess each the RF signal, the further preprocessing comprising bandpass filtering; base-banding; normalizing the RF signals by the complex value of the sample with the largest magnitude; and resampling to 100 Msps. Other embodiments comprise multi-burst, wherein a plurality of signals having a same label are processed, whereby k-multi-burst predictions comprise performing inference on each of the k input signals independently, and combining their class probability vectors. Subsequent embodiments comprise multi-burst, wherein a plurality of signals having the same label are processed, whereby k-multi-burst predictions comprise performing inference on each of the k input signals independently, and combining their class probability vectors; wherein k is 5. Additional embodiments comprise Merged-Averaged Classifiers via Hashing (MACH) to learn and combine multiple smaller classifiers instead of one large classifier wherein each class i is uniquely mapped into a set of buckets B<k via a hash function $h_j$, the unique class mapping is repeated R times whereby accuracy for large class problems is improved. Another embodiment comprises at least one of transfer learning comprising a classifier feature extraction, individual device detection comprising a classifier, and a cluster embedding dense layer; and unsupervised signal clustering from embedded learned features whereby the RF signals are grouped according to a device that transmitted the RF signal. A following embodiment comprises receptive field sizes of a fixed 16 μs and 2.5 μs, respectively, for the two stages. Subsequent embodiments further comprise training using a plurality of RF emitter devices to establish a training set used by the ADCC to determine features of the individual devices. In additional embodiments training of the network using a plurality of RF emitter devices comprises a training set comprising a population size of greater than 10,000 RF devices. In included embodiments the system comprises a base feature extraction component; a classifier component; a decoder component; a clustering component; and a zero-shot learning component of a clustering manifold. In yet further embodiments, after training, feature weights and classifier weights are locked. In related embodiments the samples comprise only a first 1,600 samples or 16 microseconds of a signal, whereby ID spoofing is prevented due to the ID location in the signal after the first 16 microseconds of the signal. For further embodiments the RF signals comprise at least one of Wi-Fi 802.11a signals; Wi-Fi 802.11g signals; cell phone protocol signals; access point signals; IoT devices; Bluetooth transmitter signals; extended-mode-S ADS-B transmissions from aircraft; AIS transmissions from boats; and radar return signals. In ensuing embodiments the output comprises at least one of RF fingerprinting, modulation classification, device discovery, and signal clustering and separation.

Another embodiment provides a method for determining individual RF emitters through deep-learning comprising receiving RF signals from a plurality of individual devices; producing complex-valued In-phase (I) and Quadrature (Q) IQ signal sample representations of the RF signals; processing I and Q components of the complex IQ samples in a two-stage Augmented Dilated Causal Convolution (ADCC) network comprising a stack of dilated causal convolution layers and traditional convolutional layers configured to process I and Q components of the complex IQ samples; and identifying, in an output, the individual RF emitter device whereby the individual RF emitter device is distinguished in a non-test environment. For yet further embodiments, the ADCC comprises a Gated Dilated Causal Convolutional (GDCC) operation is defined as:

$$z_i = \tanh(W_{f,i} * x_i) \odot \sigma(W_{g,i} * x_i)$$

where $W_{f,i}$ is a filter kernel for block i, $x_i$ is an input to block i, $W_{g,i}$ is a gate kernel for block i, * is a convolution operation, $\odot$ is an element wise multiplication operation, and a is a sigmoid function. For more embodiments, the stack of dilated causal convolution (DCC) layers of the method comprises a receptive field $r_i$ of a skip connection of residual block i related to a receptive field of residual block i−1, and a dilation rate ($d_i$) and kernel size ($k_i$) of block i by:

$$r_i = r_{i-1} + (k_i - 1)d_i$$

Continued embodiments include a coverage factor c for a residual block i of the stack of dilated causal convolution layers is computed recursively by:

$$c_i = \begin{cases} c_{i-1}, & d_i \leq r_i \\ c_{i-1}\left(1 - \frac{(k_i - 1)(d_i - r_{i-1})}{r_i}\right), & d_i > r_{i-1} \end{cases}$$

where $k_i$ is a kernel size, $d_i$ is a dilation rate, and $r_i$ is a receptive field. Additional embodiments comprise clustering, wherein the clustering comprises a clustering algorithm input that is a point-wise complex magnitude of the RF signals given by:

$$\{z_i\}_{i=1}^N = \{\vec{z}_1, \vec{z}_2, \ldots, \vec{z}_N\}$$

where $z_i \in \mathbb{C}^T$ are complex-valued signals of length T, and N is a number of the RF signals processed.

A yet further embodiment provides a non-transitory computer readable medium, having stored thereon, instructions that when executed by a computing device, cause the computing device to perform an individual RF emitter determination through deep-learning method operations comprising receiving RF signals from a plurality of individual devices; producing complex-valued In-phase (I) and Quadrature (Q) IQ signal sample representations of the RF signals; processing I and Q components of the complex IQ samples in a two-stage Augmented Dilated Causal Convolution (ADCC) network comprising a stack of dilated causal convolution layers and traditional convolutional layers configured to process I and Q components of the complex IQ samples; performing transfer learning comprising a classifier and a cluster embedding dense layer; performing unsupervised clustering whereby the RF signals are grouped according to a device that transmitted the RF signal; performing an individual device detection zeroshot process; and identifying, in an output, the individual RF emitter device whereby the individual RF emitter device is distinguished in a non-test environment. As used herein, identification refers to calling "device A", "device A" and so on. If there is an unknown device (not known apriori), it would be identified as novel and not given the label of a known device, such as "device A".

Figure 1:
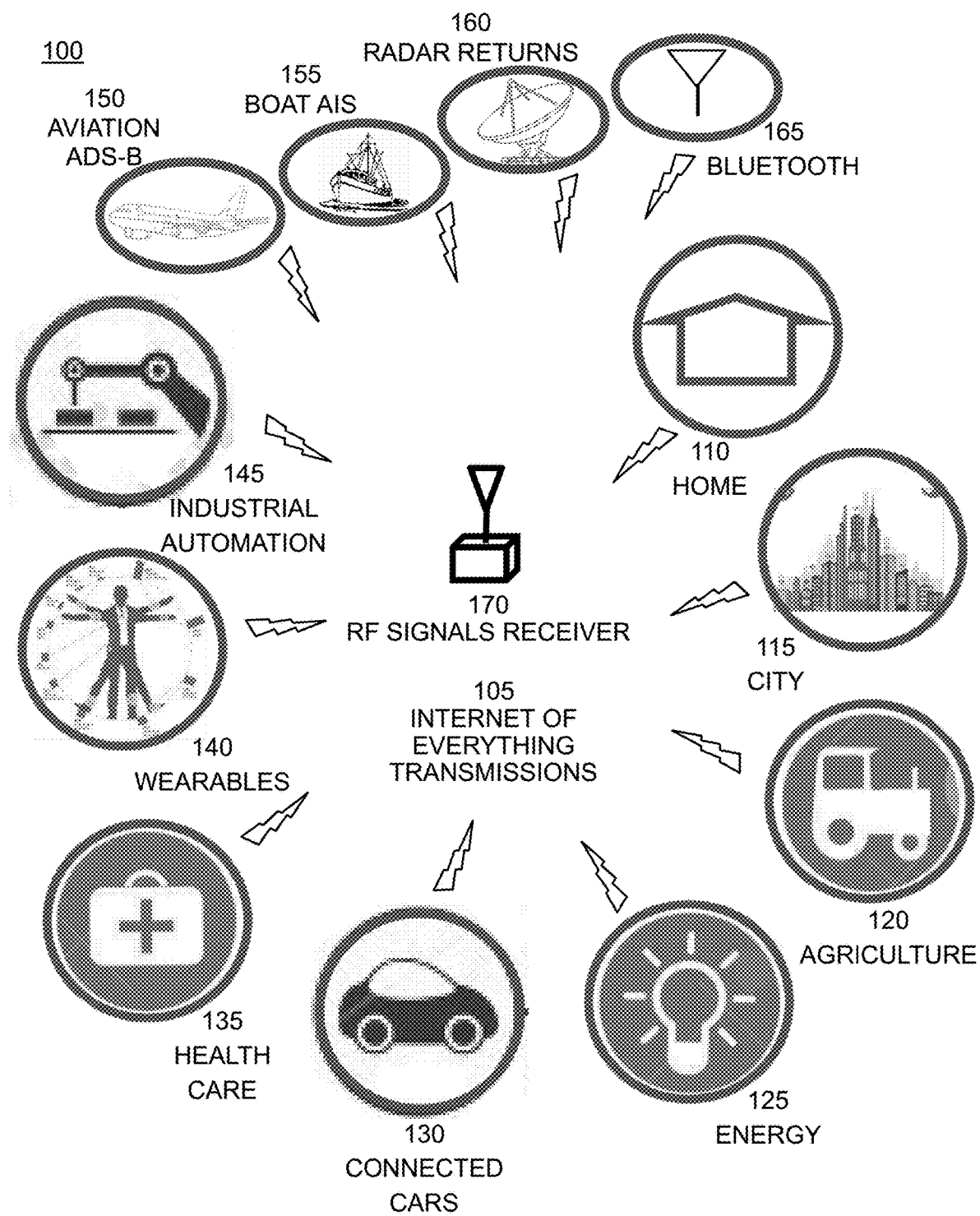
FIG. 1 depicts an Internet of Everything (IoE) signals environment configured in accordance with an embodiment.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Distinguishing between RF emitters in complex real-world environments, with upwards of 10,000 distinct emitters is very difficult problem. Emitters can include WiFi 802.11a and 802.11g protocols from cell phones, IoT devices, and access points, as well as short and extended mode-S (ADS-B) transmissions from aircraft, nautical (AIS), and radar returns. Embodiments perform novel device detection, allowing for an estimate of whether devices seen during operation or in a new environment match the set seen before, or include completely new devices (i.e., needle-in-a-haystack) in new complex environments. Embodiments also perform modulation recognition and signal separation in addition to RF fingerprinting. In deep learning networks the apriori database gets distributed in the form of the learned weights throughout the network. Declarations of apriori devices come from the output classification layer of the network, i.e., the softmax function in FIG. 3. Embodiments of the network are trained with apriori devices and then those weights are fixed during operation, forming a learned apriori database that is made up of thousands to millions of weights. Novel devices get detected through a different part of the network. While RF fingerprinting is similar to Specific Emitter Identification, it relies on expert defined features. Embodiments use deep learning instead to generate features, while not easily interpretable, they provide the ability to scale to large populations and disambiguate similar devices much better.

Embodiments scale to better than 95% accuracy with 10,000 or more devices. Additionally, the structure of model embodiments explicitly avoids ID-containing portions of the signal that are easy to spoof, making it uniquely suited to RF fingerprinting tasks. Embodiments perform generic RF feature extraction by training on simulated data and using transfer learning to fine-tune the model on real-world data.

Embodiments are flexible and extract RF-specific features that are tuned for communications protocols. Embodiments can be utilized to perform RF fingerprinting of other RF devices, like Bluetooth transmitters or AIS transmissions from boats. In addition, embodiments can be used on other non-communications types of RF data. For example, identifying or matching radar returns to individual emitters, moving beyond RF fingerprinting.

At its core, present embodiments comprise a method for extracting features from raw RF signals through a novel deep learning approach. These features support many RF applications. For example: modulation recognition, novel device detection, unsupervised signal clustering (i.e., pulse to emitter association), and target separation from background, amongst many others.

Each of the five following publications: (1) *Dilated Causal Convolutional Model For RF Fingerprinting*, Josh Robinson, Scott Kuzdeba, James Stankowicz, Joseph Carmack, BAE Systems FAST Labs 6 January, 2020; (2) *RiftNet: Radio Frequency Classification for Large Populations*, Josh Robinson, Scott Kuzdeba, BAE Systems FAST Labs 10 January, 2021; (3) *Transfer Learning with Radio Frequency Signals*, Scott Kuzdeba, Josh Robinson, Joseph Carmack, BAE Systems FAST Labs 12 January, 2021; (4) *Novel Device Detection Using RF Fingerprints*, Josh Robinson, Scott Kuzdeba, BAE Systems FAST Labs 27 January, 2021; and (5) *Unsupervised Signal Clustering through Deep Manifold Learning*, James Stankowicz, Scott Kuzdeba, BAE Systems FAST Labs 27 January, 2021 is incorporated by reference for all purposes.

FIG. 1 depicts an Internet of Everything signals environment 100 in which embodiments operate. Examples of Internet of Everything (IoE) transmission sources 105 comprise home 110; city 115; agriculture 120; energy 125; connected cars 130; health care 135; wearables 140; and industrial automation 145. Further transmission sources comprise aviation (ADS-B) 150; boat (AIS) 155; radar returns 160; and Bluetooth 165. Each signal is received by system RF signals receiver 170.

Figure 2:
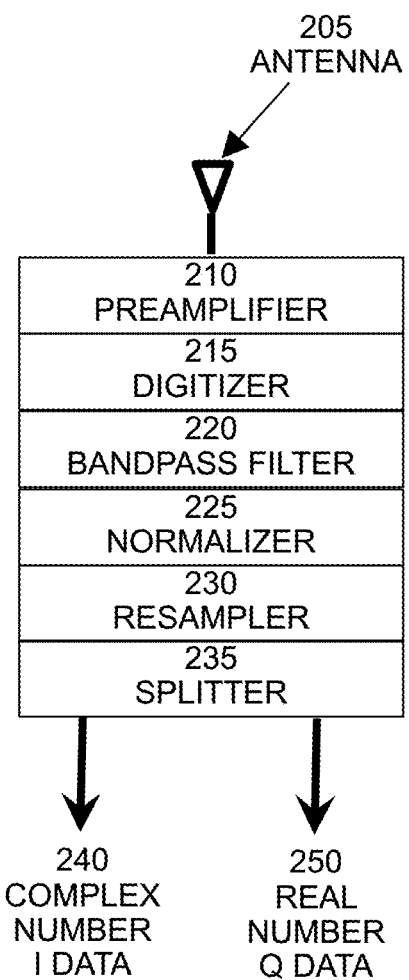
FIG. 2 depicts system components configured in accordance with an embodiment.

FIG. 2 depicts system components 200. In embodiments, hardware for the system comprises at least one antenna 205 that captures wireless RF signals and directs them to receiver electronics that may include a preamplifier 210 and digitizer 215, as well as a bandpass filter 220. In normalizer 225 embodiments all complex values $z_i$ are normalized to $z_i = z_i/z_m$, where $z_m$ is the complex value of the example with the maximum magnitude. Next, the example, in embodiments, is resampled 230 to 100 Msps and truncated to only include the first 1600 IQ values, thus providing a uniform length input sequence to the ADCC model. Lastly, in embodiments the complex data is split 235 into its real 250 and complex 240 parts and each part is used as a different channel for the input layer of the ADCC model. Note that in embodiments, 1600 samples is only for part of the network (left side of FIG. 3) the other part of the network (right side of FIG. 3) samples throughout the rest of the signal. Further embodiments require slightly different normalizations and resampling.

Figure 3:
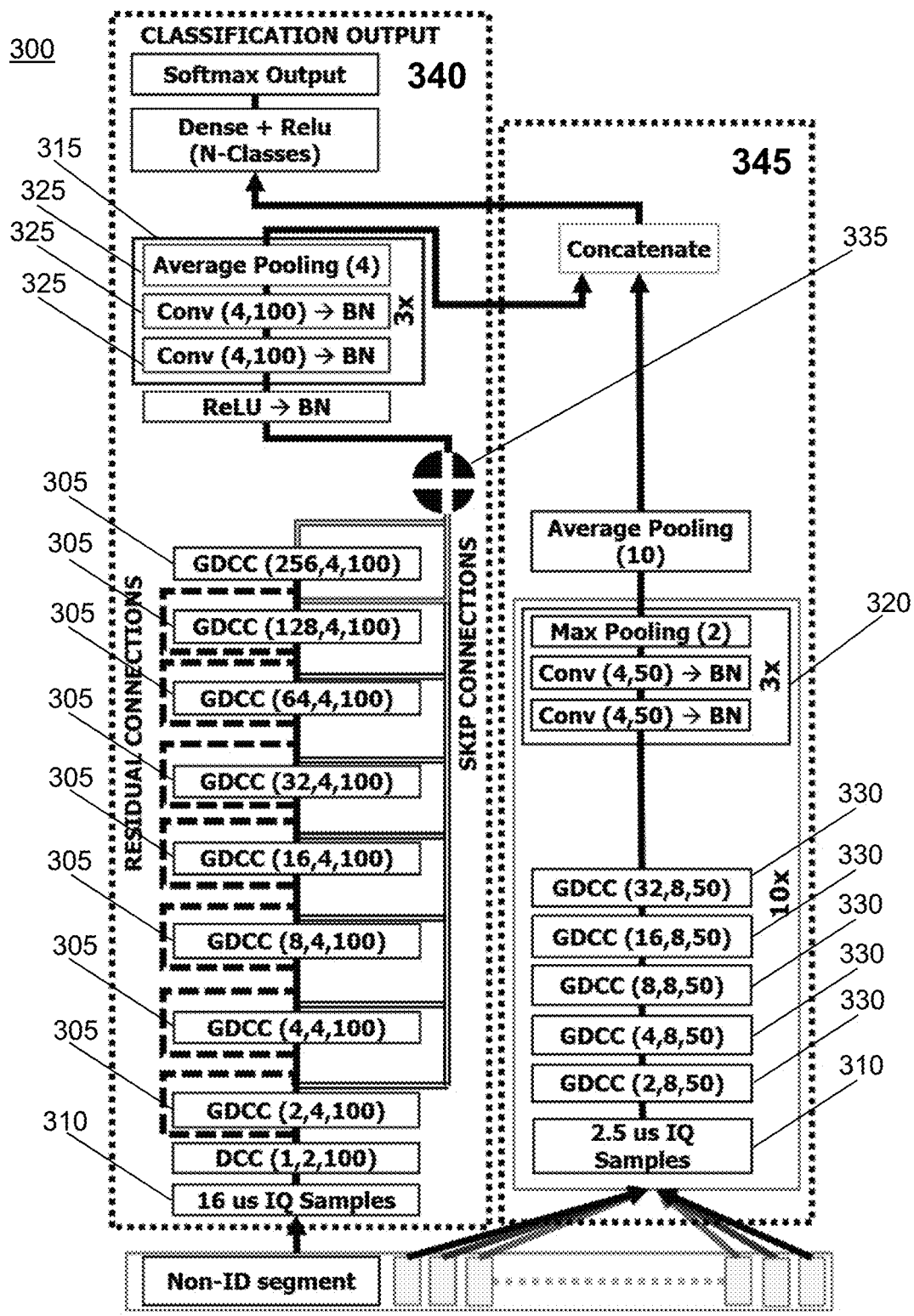
FIG. 3 depicts a system architecture configured in accordance with an embodiment.

FIG. 3 depicts system architecture details 300, showing the Augmented Dilated Causal Convolutional Network Architecture (ADCC). DCC is the dilated causal convolution operation with the dilation rate, kernel size, and number of filters shown in parentheses. BN indicates batch normalization and parenthetical numbers on pooling blocks denote pooling rate. While DCC may be known, embodiments extend and apply it to radio frequency signals, in particular to complex-valued signals and tested it with communications and radar signals. "Augmented" language covers the architecture that allows embodiments to scale to the size of RF signals. Most networks developed for speech or images can't scale to the magnitude of RF signals. Embodiments use the DCC as a basis for its ability to exponentially scale and apply it in two novel ways. First, we use it to extract (learn) features from large portions of RF signals that come from standardized portions of the signal due to protocol standards, etc., such as synchronization sequences. This is depicted in 340 in FIG. 3. Second, embodiments use it to extract (learn) features throughout the entire signal (345 in FIG. 3). RF signals can be extremely long (in bandwidth or time) and thus this addition allows embodiments to scale to handle this magnitude. This portion takes in smaller chunks over time, rather than the larger, continuous chunk from 340, and averages across each chunk that it takes in to enable robustness against variation in the signal (340 does not need to address this since that portion of the signal is more stable per protocol design). The way embodiments are constructed, the symbiotic design takes individual paths and combines them together.

System embodiments take into account the characteristics of typical communications signals. The early part of comms signals frequently contain synchronization content, which allows receivers to identify when a signal of interest is actually occurring. After the synchronization component tends to be preamble and header content. By definition, both the sync and preamble components often remain largely unchanged across signals within a single protocol. Embodiments constrain the network to only make use of the first 1600 IQ samples (16 µs), thereby avoiding the potentially ID-containing portions of the headers in both Wi-Fi and ADS-B (310). A network would essentially learn a highly accurate ID demodulator without this constraint—not a desirable outcome when hoping to distinguish devices based on hardware characteristics and avoiding the ability to be spoofed. Furthermore, network embodiments are able to identify more subtle differences between devices by focusing on the early, consistent part of each signal, than if it solely used the variable data component of the signal. This is the input labelled "Non-ID segment" at the bottom of FIG. 3. The other smaller boxes (310) of input sample throughout the rest of the signal, and are smaller to avoid learning an ID.

The Augmented Dilated Causal Convolution (ADCC) model architecture is depicted in FIG. 3. In embodiments it processes the first 1600 IQ values of each example with a stack of residual blocks (305) in FIG. 3. For embodiments skip connections from each block are summed and used as input to a stack of traditional convolution and pooling layers (large (315) block in FIG. 3) resulting in 2500 features. In embodiments ten smaller traditional convolution and pooling blocks are also used to extract an additional 2500 features from twenty subsequences uniformly distributed throughout the rest of the example (320) block in FIG. 3). These smaller subsequences allow relevant features to be extracted from the rest of the example without being long enough to encode ID-specific information about the device once passed through a large average pooling layer. The 2500 features learned from the first 1600 IQ values and the 2500 features learned from the smaller subsequences in the remaining example embodiments are concatenated and then fed as input to a dense classification layer. For embodiments, all convolutions in the model are one-dimensional. Gated Dilated Causal Convolutional (GDCC) details are provided in FIG. 4.

The present preamble architecture in one embodiment is shown in 340. The first 1,600 complex IQ samples are split into their I and Q components and each part is used as a different channel for the input layer of the Gated (G) Dilated Causal Convolution (DCC) stack. The DCC stack contains DCC layers with increasing dilation rates DCC blocks (305) in FIG. 3), such that the receptive field increases exponentially and is close to 1600 for the last DCC layer (dilation rate is the first parenthetical number). This allows earlier layers to extract high frequency features, i.e., more temporally localized fingerprint elements, while later layers extract relevant features across the entire input signal. Note that, in embodiments, DCC components are Gated DCC (GDCC) components as discussed in FIG. 4. Skip connections from each block are summed and used as input to a stack of traditional convolution and pooling layers ((335) blocks in FIG. 3), which are primarily used as a means of dimensionality reduction before the fully-connected softmax layer. The softmax function is a function that turns a vector of K real values into a vector of K real values that sum to 1. The input values can be positive, negative, zero, or greater than one, but the softmax transforms them into values between 0 and 1, so that they can be interpreted as probabilities. The use of dilated convolutions increases the receptive field size exponentially, leading to performance improvement of 10% for a full receptive field over traditional convolutions with a full receptive field of 16 As for the preamble. In embodiments, extra layers ((305), (330), or (315), (325), (320) boxes) are added or parameters (parenthetical numbers) are changed.

While focusing on the consistent sync and preamble aspects of the signal allows the network to identify more subtle hardware fingerprints, it ignores the rest of the signal. Signal processing techniques use longer signals or multiple signals to improve SNR by integrating out noise. Embodiments approximate this by extracting features from small subsequences of the rest of the signal, as shown in 345. The subsequence model is essentially a smaller version of the core feature extraction stack, 340, but with a final receptive field of only 2.5 µs. The model parameters are shared across all subsequences, and extracted features are pooled and concatenated with the preamble-derived features before performing the softmax. The subsequences are short enough that they never span a complete ID-containing symbol, and the average pooling further prevents learning any ID specific features.

Fixing a receptive field of 2.5 µs for the reasons just provided and increasing the number of subsequences steadily increases accuracy to around 85% in embodiments. Since a computational trade-off must be made to ensure reasonable training times, embodiments employ 10 subsequences to balance accuracy and training speed as points beyond this showed a diminishing return of performance gain.

Figure 4:
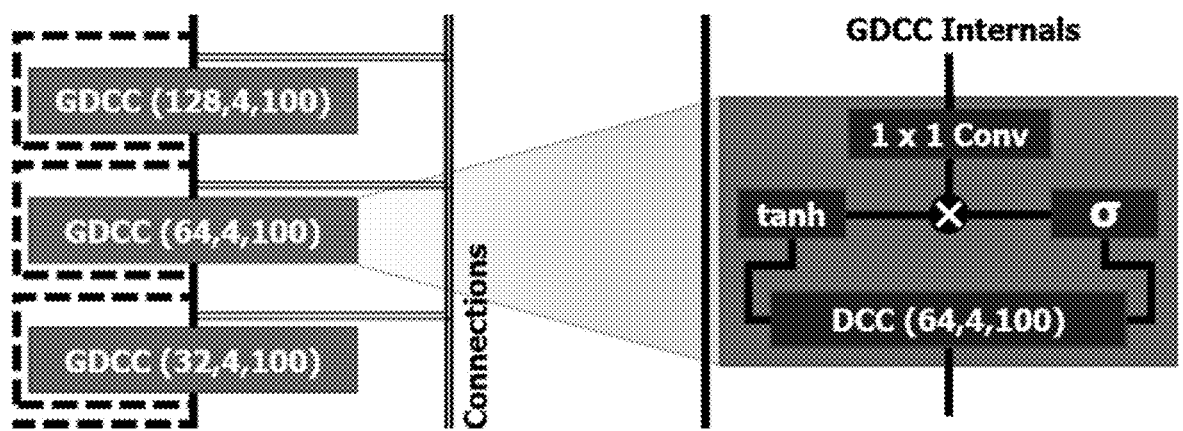
FIG. 4 depicts system architecture GDCC details configured in accordance with an embodiment.

FIG. 4 depicts system architecture details for Gated Dilated Causal Convolutional (GDCC) 400. Note that the (G) DCC blocks (305) in FIG. 3 are actually Gated DCC functions, as depicted here in FIG. 4. Either can work in system architecture embodiments. For embodiments, GDCCs performed best. Before the first residual block as seen in FIG. 3, there is a single causal convolution layer (or equivalently a DCC layer with dilation rate set to one). The feature maps of this layer are fed into the first of eight residual blocks. Each residual block contains a gated convolution operation that is causal and dilated (called from here on out GDCC). Mathematically, the GDCC operation is defined as:

$$z_i = \tanh(W_{f,i} * x_i) \odot \sigma(W_{g,i} * x_i) \quad \text{Eq. (1)}$$

where $x_i$ is the input to block i, $W_{f,i}$ is the filter kernel for block i, $W_{g,i}$ is the gate kernel for block i, * is the convolution operation, $\odot$ is the element wise multiplication operation, and $\sigma(z)$ is the sigmoid function. The output of the GDCC operation is then passed through a causal convolution with kernel size of one, which is then summed with the residual connection and fed into the next residual block. The dilation rate for the GDCC operation of each block doubles with respect to the previous block such that the dilation rate pattern for the eight residual blocks is 2, 4, 8, . . . , 256.

Embodiments use eight residual blocks with doubling dilation to facilitate exponential growth of the receptive field resulting in the final residual block with a receptive field approaching the input subsequence length of 1600 IQ values. The receptive field $r_i$ of the skip connection of residual block i is related to the receptive field of residual block i−1, and the dilation rate ($d_i$) and kernel size ($k_i$) of block i by:

$$r_i = r_{i-1} + (k_i - 1) d_i \quad \text{Eq. (2)}$$

The first causal convolution layer in the residual blocks has a kernel size of two, resulting in its outputs having a receptive field of size two. Each residual block has GDCC convolutions with kernel size of four. Applying Eq (2) to the doubling dilation rate pattern results in the receptive field pattern 2, 8, 20, . . . , 764, 1532 for the eight stacked residual blocks. So each feature map in the skip connection of the last residual block receives information from 1532 IQ values of the input sequence.

Even when the receptive field of the last residual block is approximately the size of the original input, there are still DCC architectures that do not capture all input data. Using dilation rates larger than the incoming receptive field ($d_i > r_{i-1}$) results in output feature maps with receptive fields missing connections to portions of the input data. Embodiments define the coverage factor of residual block i as a ratio where the numerator is the number of input values that contribute to the block and the denominator is the receptive field of the block. "Receptive field" for a block is defined to be the number of values of the input sequence between the first and last value that contribute to a block's output. There is an alternative possible definition: the number of input values that contribute to the block. For DCC networks, these definitions differ. The coverage factor for residual block i can be computed recursively:

$$c_i = \begin{cases} c_{i-1}, & d_i \leq r_i \\ c_{i-1}\left(1 - \dfrac{(k_i - 1)(d_i - r_{i-1})}{r_i}\right), & d_i > r_{i-1} \end{cases} \quad \text{Eq (3)}$$

where $r_i$ is given by Eq (2). This quantifies how much dilation alters a residual block's receptive field from a standard convolution layer. It was determined empirically that DCC models containing residual blocks with low coverage factors have lower validation classification accuracy.

Each convolution and pooling block consists of two regular convolutions with kernel size four followed by a pooling layer with downsample rate four. The convolutions use ReLU activations.

Additionally, batch normalization layers are used after every regular convolution layer. In total, in embodiments, there are three traditional convolution and pooling blocks which results in a down sampling factor of 64 with respect to the summed skip connections from the residual blocks.

Each of the ten subsequences taken from the remaining portion of the example after the first 1600 IQ values is processed by a stack of dilated causal convolution and pooling layers as depicted in the (320) 10 block in FIG. 3. Each subsequence consists of 250 IQ values and is then fed through two blocks consisting of two convolutions with kernel size four, fifty filters, and ReLU activation followed by a max pooling layer with downsample rate four. Batch normalization layers are also used after each of the causal convolutions. The stack of convolution and pooling blocks used to process each subsequence of 250 IQ values share the same weights. As seen in conjunction with FIG. 3, the feature maps of each subsequence processing stack are fed through a large average pooling layer and fed through a stack of 5 DCC layers with dilation rates 2, 4, 8, 16, and 32.

Figure 5:
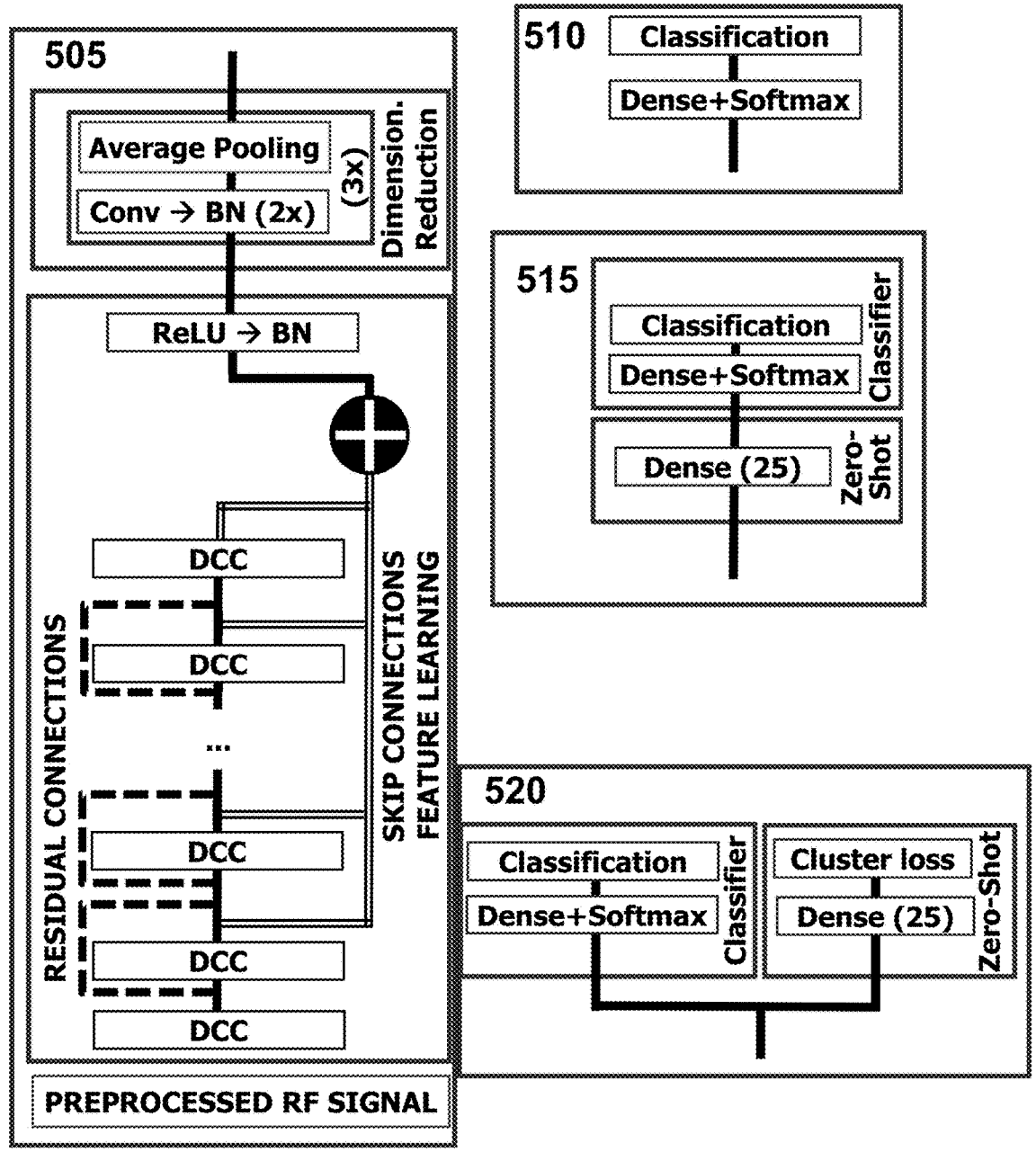
FIG. 5 depicts architecture embodiment details configured in accordance with an embodiment.

FIG. 5 depicts architecture embodiment details 500. The embodiment in FIG. 5 is used or extended to provide a feature space to build a clustering representation. An example of embodiment variants comprise Base feature extraction, 505, which is an illustration of an embodiment of a similar architecture to the left side of FIG. 3; Original classifier 510; Classifier with additional embedding layer, 515; and Classifier and separate cluster embedding branch 520. The simplest embodiment to extend the network to additionally perform novel (individual) device detection is to make use of the class probability vectors directly, as in 510. The one-hot-encoded classifier outputs are effective at classification tasks, so embodiments can make use of them for defining a representation for novel device detection. Embodiments assume that devices in the training set will have a sparse class probability vector (one element close to one and the rest close to zero) while a novel device will have a less sparse class probability vector. Embodiments use this assumption to convert from the class probability vector into a metric that can be used for novel device detection.

In embodiments, two metrics are considered, each of which provides a single value which can be thresholded to determine whether a signal is out-of-library. First is the maximum class probability, which is simply the max value in the class probability vector. Second is entropy, which is defined in Eq (4).

$$H = -\Sigma_i p_i \log p_i \quad \text{Eq. (4)}$$

Receiver Operating Characteristics (ROC) curves are defined by sweeping over the threshold for either the max class probability or entropy.

The class probability vectors are a constrained representation that reduces the novel device detection problem to a single number. A straightforward update of the model is shown in 515, where a separate embedded feature space is defined to build a clustering representation. The added compressed feature space is called the clustering manifold, and it is used for novel device discovery. Thus, embodiments of the model can simultaneously perform classification and signal embedding for novel device detection.

In this setting embodiment, the classifier is trained the same way it normally is, but the last layer already exhibits clustering behavior because it is connected to the softmax layer. This is due to the sparse nature of the one-hot encoding—the categorical cross-entropy loss function encourages an output with just a single non-zero value, so the previous layer will tend to have distinct values for that class.

Embodiments implement a more complex approach, by creating a separate output branch that explicitly encourages a clustering representation, as in 520. This clustering manifold has an additional clustering loss added during training to enforce desired device clustering. The clustering loss has three components to it.

The first component is an intra-centroid loss and is used to encourage signals for known devices to fall close to their class centroid in the clustering manifold. This component, $L_{IC}$, is the sum of the L2-distance from each signal as encoded in the clustering manifold, $z_i$, to its class centroid $c_k$, as shown in Eq (5), where N is the set of signals in the current training batch, i is the index of a given signal, and k is the index for the class of the given signal.

$$L_{IC} = \sum_N \|z_i - c_k\|^2 \quad \text{Eq (5)}$$

The next component is a nearest neighbor loss, $L_{NN}$. This component is used to encourage the closest centroid for a given signal to be the class centroid for the class of the signal. This is computed as the sum of the difference in the L2-distance from the signal encoding, $z_i$, to its class centroid, $c_k$, and the signal encoding to the closest centroid, $c_m$, as shown in Eq (6), where m is the index for the closest centroid.

$$L_{NN} = \sum_N \|z_i - c_k\|^2 - \|z_i - c_m\|^2 \quad \text{Eq (6)}$$

The final component, $L_{CS}$, encourages the different class centroids to be spread out or separated across the manifold. It is computed as the inverse of the mean of pairwise centroid distances, as shown in Eq (7), where K is the set of centroids.

$$L_{CS} = \left( \sum_{j \in K} \sum_{k \in K} \|c_j - c_k\|^2 \right)^{-1} \quad \text{Eq (7)}$$

The total loss used to train the network is the combination of the classifier loss, $L_{class}$, and these new components to encourage clustering, Eq (8). In embodiments, computing the clustering loss requires keeping the cluster centroids up to date—recomputing the centroids is expensive because it requires a cycle through the entire training dataset. Embodiments constrain the centroid recomputing operation to occur only a few times per epoch, and emphasize the classification loss in early epochs and the cluster loss in later epochs. The final loss is shown in Eq (8), where $\alpha$ is steadily increased at each epoch during the training process.

$$L = (1-\alpha) L_{class} + \alpha (L_{IC} + L_{NN} + L_{CS}) \quad \text{Eq (8)}$$

The clustering manifold is used to learn a centroid for each device. The centroids are represented as a mixture of Gaussians, with diagonal covariances, calculated using expectation maximization. To assess performance during testing, embodiments compute an in-library (IL) accuracy for detecting a device in the target dataset as being one of the devices seen during training, and an out-of-library (OOL) accuracy for correctly detecting a novel device in the target data.

During testing, since the centroid representation is a mixture of Gaussians, embodiments assess the distance to the closest mixture component as distance metric. Embodiments must measure the distance between a signal's clustering manifold embedding to each centroid to determine if a given signal in the clustering manifold is close enough to a known centroid to be called IL. The distance metrics considered are Euclidean distance Eq (9) and Mahalanobis distance Eq (10) (the Mahalanobis distance is a measure of the distance between a point and a distribution), where S is the centroid covariance matrix. Embodiments sweep through threshold values on the distance metric to assess a Receiver Operating Curve (ROC) for IL versus OOL performance. The Area Under the Curve (AUC), is used to measure the performance from the ROC (see FIG. 10).

$$d(\vec{x},\vec{y}) = \sqrt{(\vec{x}-\vec{y})^T(\vec{x}-\vec{y})} \quad \text{Eq (9)}$$

$$d(\vec{x},\vec{y}) = \sqrt{(\vec{x}-\vec{y})^T S^{-1}(\vec{x}-\vec{y})} \quad \text{Eq (10)}$$

Training a classifier results in a classifier that also has a compressed clustering manifold where known devices can be clustered. These devices are called the Known Known Classes, KKCs, since embodiments know about them during training and know their labels. They act as positive training examples that are wished to accurately classify. However, there is nothing to prevent new unseen classes from overlapping the locations of the known classes on the manifold.

For embodiments, the goal is to enforce clusters within the clustering manifold for known devices that are separated in the manifold from unknown, future novel devices that could present themselves during testing. To promote novel devices into new regions of the clustering manifold, a set of Known Unknown Classes, KUCs, is also used during training. This set of devices is known during training, but they aren't necessarily grouped into any meaningful classes. They can be thought of as a type of surrogate for out-of-library devices and help to encourage new devices to not overlap with known device clusters.

During training, a classifier is built using both the KKCs and KUCs, and the location of each KKC training example on the clustering manifold is identified. These locations are used learn a cluster centroid for each of the KKCs, and the KUCs are not used during testing. The KUCs effectively constrain the cluster boundaries of the KKCs because they force the centroid covariances to be lower. This indirectly encourages potential unknown classes to be distinct from the KKCs. Thus, during testing, Unknown Unknown Classes, UUCs, or novel devices, are more likely to be detected as such and not errantly classified as one of the known devices.

Figure 6:
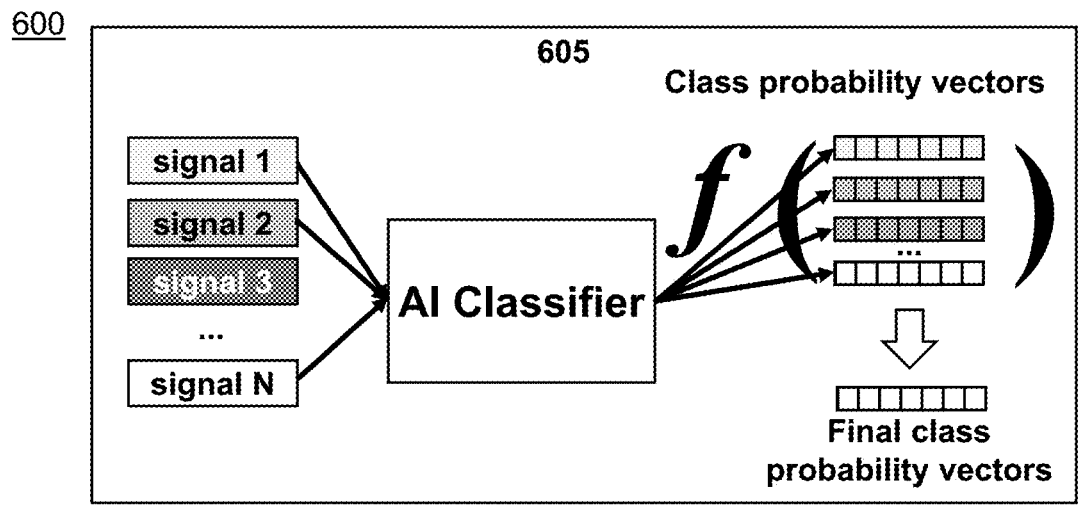
FIG. 6 depicts a multi-burst and Merged-Averaged Classifiers via Hashing (MASH) embodiments configured in accordance with an embodiment.
Figure 6:
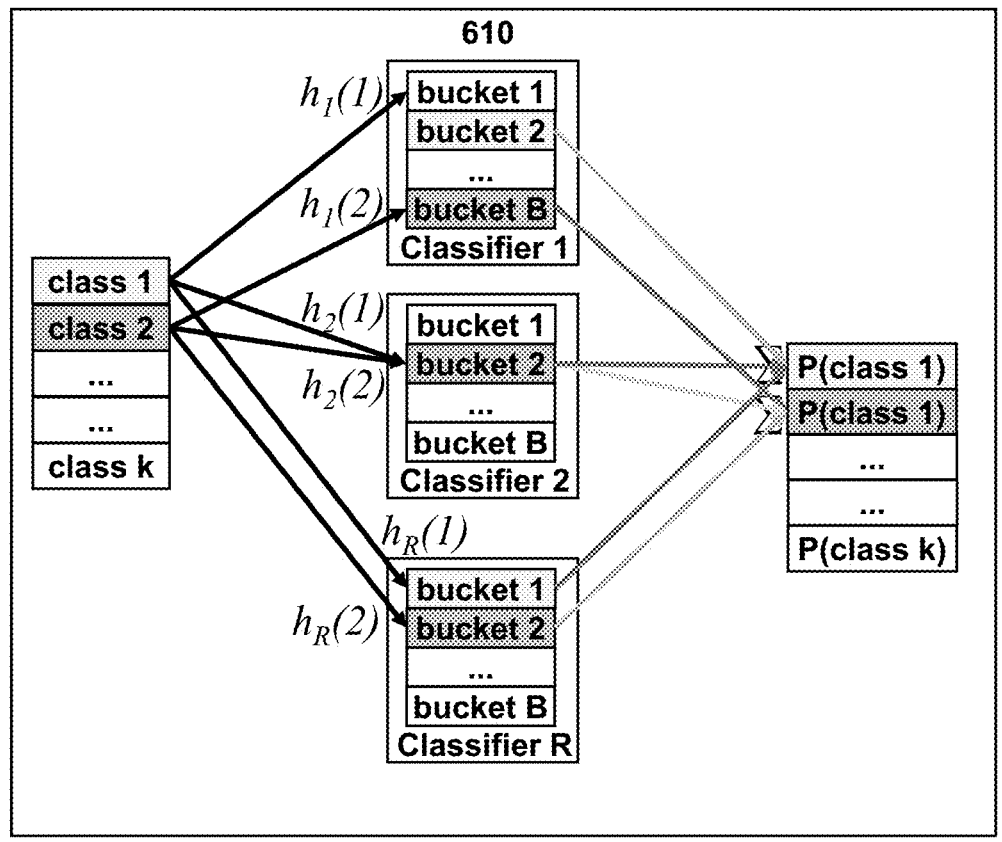

FIG. 6 depicts multi-burst and Merged-Averaged Classifiers via Hashing (MACH) embodiments 600. In the RF domain one can observe a collection of signals known to all be transmitted by the same, yet unknown, device. This is distinct from traditional classification tasks, where training and validation occurs on single examples. This type of "bursty" behavior is referred to as "multi-burst". In essence, this is still a classification task, but with additional information: multiple examples sharing the same label. To perform k-multi-burst predictions, embodiments perform inference on each of the k input signals independently and combine their class probability vectors, as shown in 605.

605 depicts an embodiment under a multi-burst setting. Class probability vectors from multiple signals of interest are combined to provide a single prediction. Since embodiments independently classify each signal prior to combining them, this fusion of predictions from each burst is only used during inference and does not require any change to the training of the model. In embodiments, a product produces the best accuracies for combining class probability vectors.

Performance dramatically increases when operating on multi-burst data. Incorporating multiple signals helps to further drive down noise and improve accuracy, with performance plateauing after incorporating at least five signals in a multi-burst fashion.

610 depicts a Merged-Averaged Classifiers via Hashing (MACH) embodiment to further improve accuracy for large class problems. MACH learns and combines multiple smaller classifiers instead of one large classifier. In this approach, a large number of classes k are mapped into a smaller number B of meta-classes (or buckets) using a 2-universal hash function. A total of R unique and independently chosen hash functions are selected, providing R mappings of k classes into B buckets. A separate classifier is learned for each hash function. During testing, summing over the probabilities of each bucket that contains class k for each classifier r. The probability of an example being in class k is obtained via an argmax operation of the resultant sums.

Using the MACH approach, each class i is uniquely mapped into a set of buckets B<k via a hash function $h_j$. This is repeated R times, with each resultant classifier utilizing a different hash function. To predict the probability of a particular class, the probabilities of each contributing class-bucket are averaged.

Figure 7:
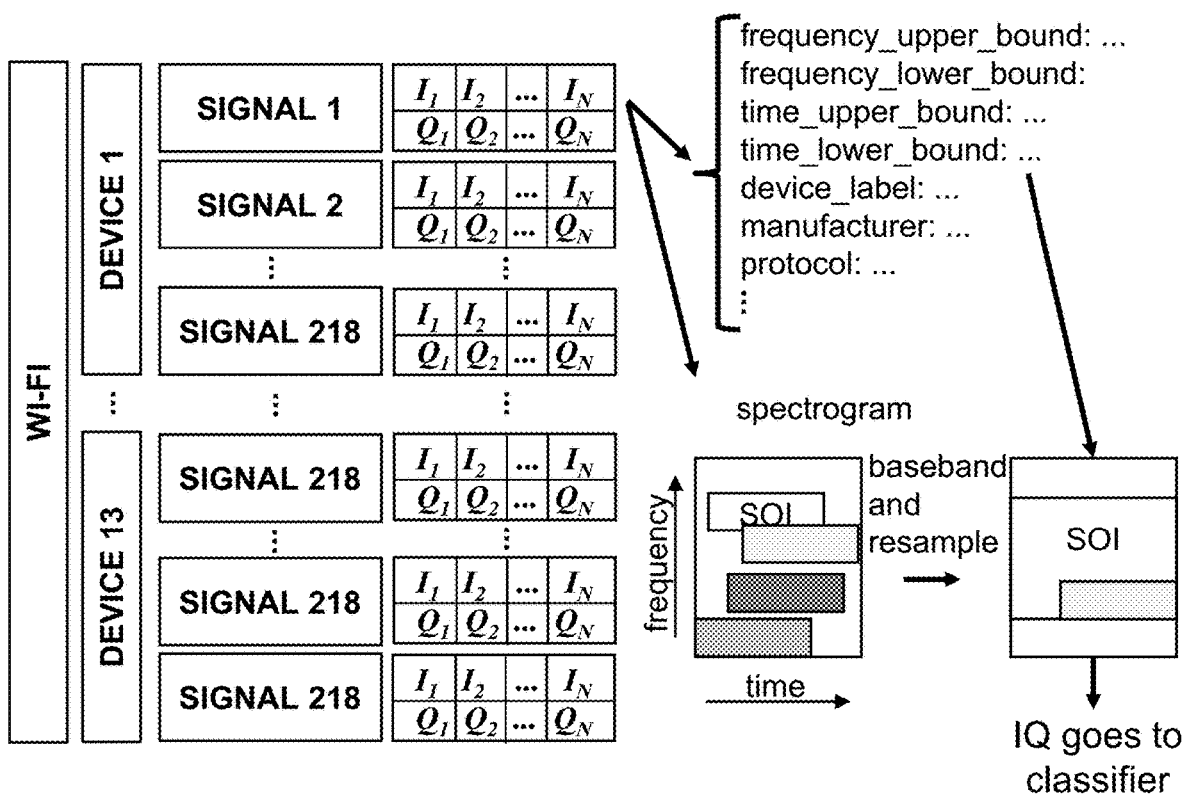
FIG. 7 depicts preprocessing configured in accordance with an embodiment.

FIG. 7 depicts data and preprocessing steps 700. For embodiments data for preprocessing comprises a dataset provided by the DARPA Radio Frequency Machine Learning Systems (RFMLS) program. This dataset contains terabytes of raw RF signals from thousands of Wi-Fi (802.11a and 802.11g) and ADS-B devices. In other embodiments tests were conducted on synthetic data generated for testing.

IQ signal representations are provided for each signal for either training, Devices 1-7, or testing, Devices 8-13. Metadata from signal collection provides information used for preprocessing.

All signals are first preprocessed by filtering to the frequency of the signal of interest (SOI) and resampling to 100 MSps. The signal is then normalized by the complex value of the sample with the largest magnitude. Only the first 1600 IQ samples, or 16 As of data are used, thus avoiding any potential MAC address or aircraft ID. FIG. 7 shows how the dataset is partitioned into devices and signals, and the preprocessing steps. Training data are signals from Devices 1-7, and testing data are signals from Devices 8-13. In the figure, Device 1 (13) is an example of a training (test) signal.

Figure 8:
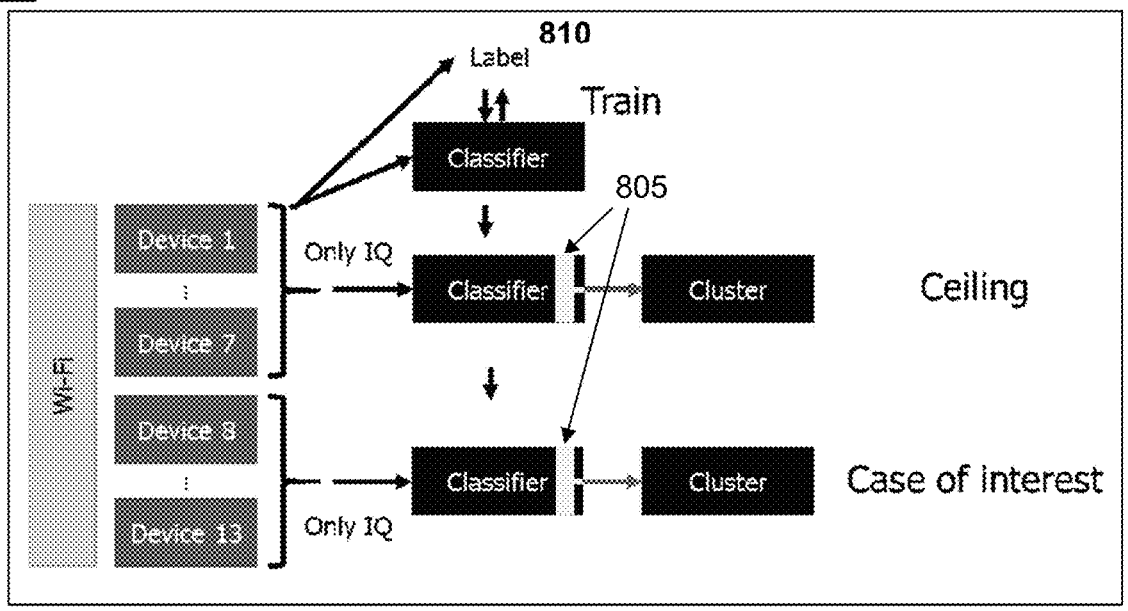
FIG. 8 depicts training and unsupervised signal clustering configured in accordance with an embodiment.
Figure 8:
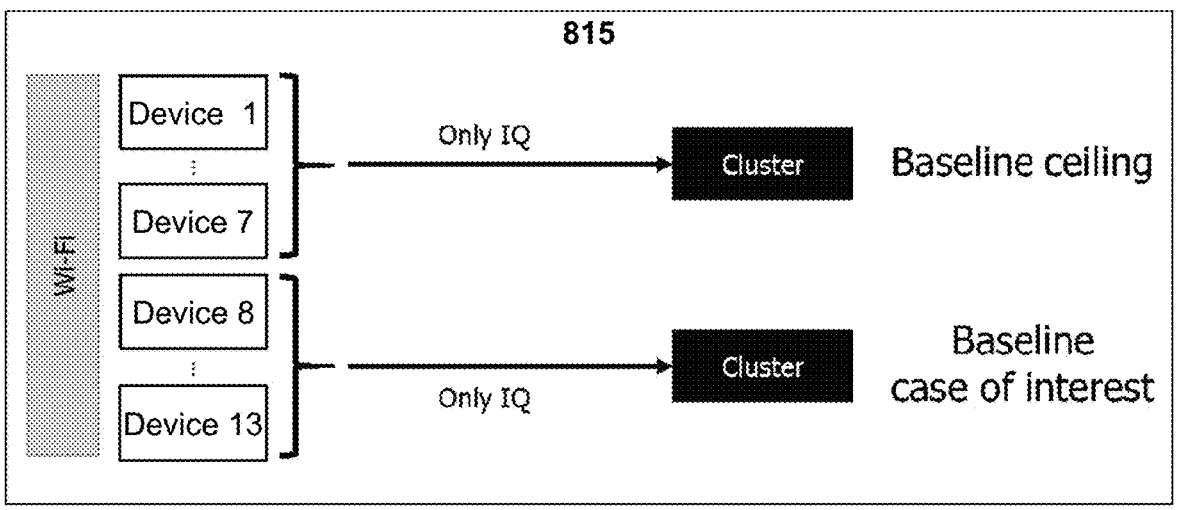

FIG. 8 depicts training and unsupervised signal clustering 800. Specifically, training 810 and unsupervised signal clustering 815. Certain embodiments are trained with default parameters. In embodiments, after training, the classifier weights are locked and do not change. Clustering is used in training embodiments. Clustering is performed as follows. For an M-dimensional vector representation of the signal, the input to the clustering algorithm is $x_i \in R^M$ for each signal i=1, . . . , N. These vectors are passed through Uniform Manifold Approximation and Projection (UMAP). This can produce a lower dimensional embedding of any dimension, and embodiments chose two dimensions to enable visualization. From here, Density-Based Spatial Clustering of Applications with Noise (DBSCAN) is used to perform unsupervised clustering:

$$\text{Cluster}(\{x_i\}_{i=1}^N) = \text{DBSCAN}(\text{UMAP}(\{x_i\}_{i=1}^N)) \qquad \text{Eq (11)}$$

To understand the range of performance, embodiments perform clustering on both the training and test dataset. Clustering over the training dataset provides a ceiling of performance since that dataset was used to optimize the system. This training and baseline testing process is shown in 810. Training is called out at the top of the figure. Labels are used to learn the weights of the network, which are then fixed. Any signal passed through the resulting trained network generates a 100-dimensional latent vector, denoted by (805) in the figure. Clustering is performed on these 100-dimensional vectors so that $x_i \in R^{100}$ in Eq. (11). Clustering is performed on both the training set of devices, Device 1-7, and test set, Device 8-13. The training set provides an expected ceiling on performance and the test set is the "case of interest" (COI).

Embodiments present two sets of metrics. The first set computes the "purity", "completeness", and "isolation" scores. The second set computes the "homogeneity", "completeness" and "V-score" from scikit-learn (scikit-learn is a software machine learning library for the Python programming language). The former are tailored to unsupervised learning in the RF domain, while the later are information-theoretic, and bridge the gap to other fields of machine learning. Homogeneity and purity are quantitative measures of what percentage of a cluster is made of a single true underlying label. The completeness measure in the two cases is computed differently, but both measure if all members of the same class are assigned to the same cluster. Isolation combines completeness and purity, while V-score combines homogeneity and the information-theoretic completeness. The RF-based purity, completeness, and isolation scores are defined for each device. In embodiments, the results are averaged across all devices.

For a baseline comparison, embodiments also perform clustering directly on the raw IQ signal. Here, the clustering algorithm input is the point-wise complex magnitude of the signals. Starting with $$\{z_i\}_{i=1}^N = \{\vec{z}_1, \vec{z}_2, \ldots, \vec{z}_N\} \qquad \text{Eq (12)}$$

where $z_i \in C^T$ are complex-valued signals of length T, embodiments compute the pointwise complex magnitude of each signal and perform UMAP and DBSCAN as in Eq. (11) with $x_i = |z_i|$. This is illustrated in the top of 815. Additionally, signals are processed through the trained feature extractor depicted in 810 and clustered to separate out signals.

Figure 9:
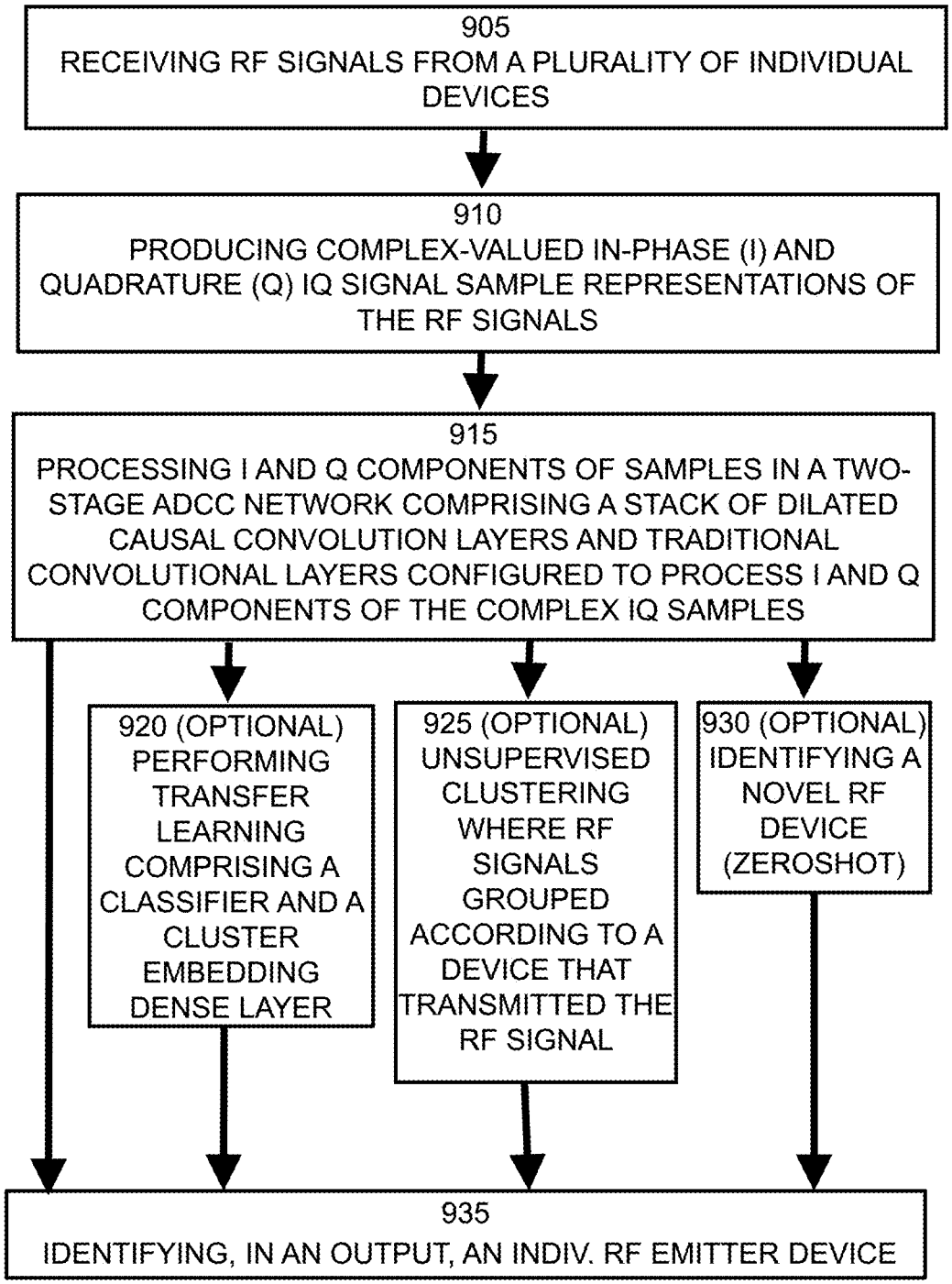
FIG. 9 depicts a method flowchart configured in accordance with an embodiment.

FIG. 9 depicts a flowchart 900. The flowchart depicts a method for an Artificial Intelligence Radio Classifier and Identifier whereby individual RF emitters are distinguished in real-world environments through deep-learning comprising: receiving RF signals from a plurality of individual devices (905); producing complex-valued In-phase (I) and Quadrature (Q) IQ signal sample representations of the RF signals (910); processing I and Q components of the complex IQ samples in a two-stage Augmented Dilated Causal Convolution (ADCC) network comprising a stack of dilated causal convolution layers and traditional convolutional layers configured to process I and Q components of the complex IQ samples (915); (optionally) performing transfer learning comprising a classifier and a cluster embedding dense layer (920); (optionally) performing unsupervised clustering whereby the RF signals are grouped according to a device that transmitted the RF signal (925); (optionally) identifying a novel RF device (Zeroshot) (930); and identifying, in an output, the individual RF emitter device whereby the individual RF emitter device is distinguished in the real-world environment (935). In embodiments, as denoted, steps (920), (925), and (930) are optional; they can be removed or added and do not need to come together. Transfer learning step (920) provides the ability to apply the network in cases where you do not have much training data available when learning network weights. Unsupervised clustering step (925) provides the ability to apply the network when there are no labels for the devices or classification tasks that are trying to be performed. Novel device protection (930) provides the ability to extend the network to identify new devices that become present during operation.

Figure 10:
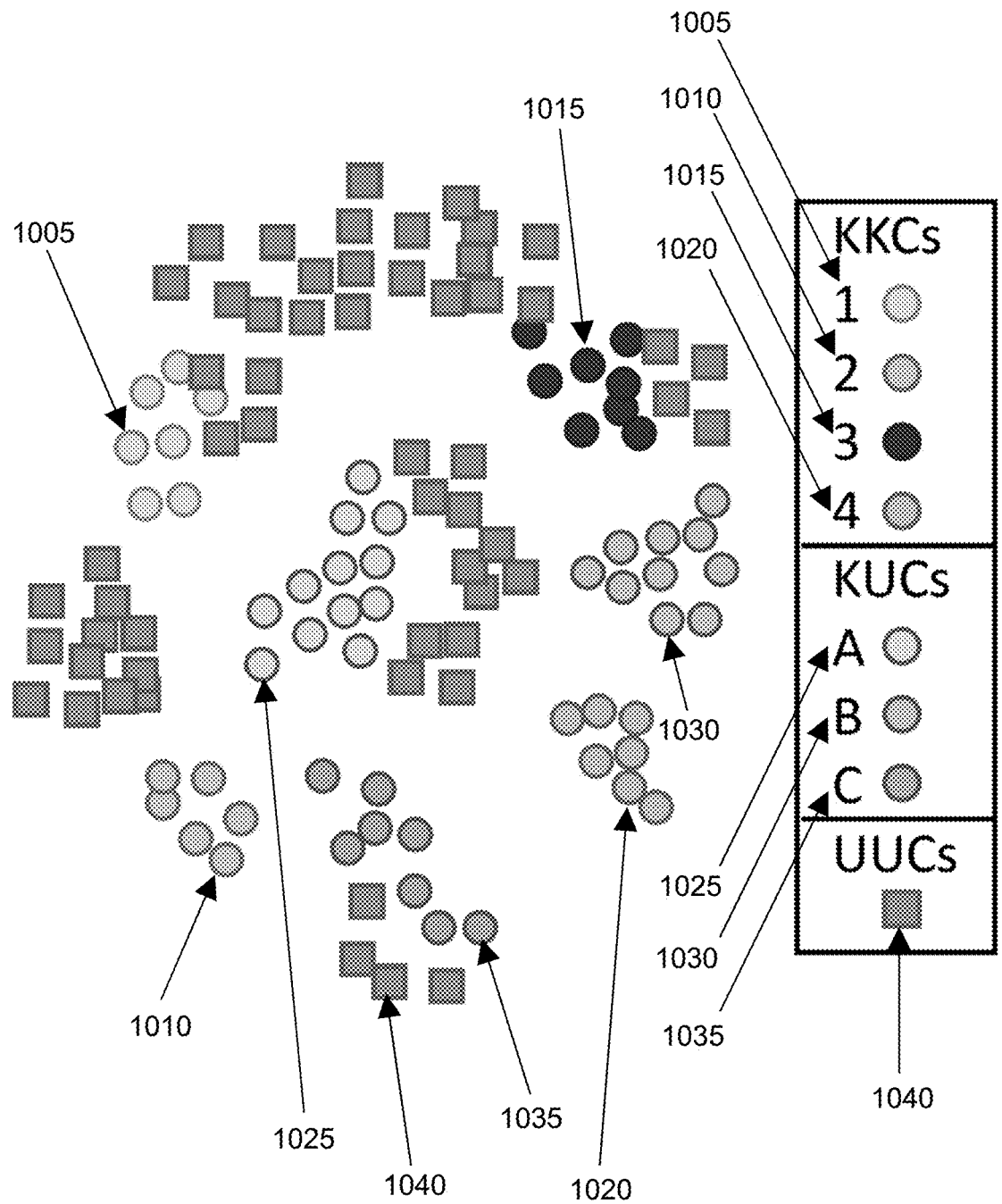
FIG. 10 depicts KKCs, KUCs, and UUCs on a 2D manifold configured in accordance with an embodiment.

FIG. 10 depicts the differences between Known Known Classes (KKCs), Known Unknown Classes (KUCs), and Unknown Unknown Classes (UUCs) 1000 on 2D manifold. For illustration, important classes are digits 1 (1005), 2 (1010), 3 (1015), and 4 (1020). Letters A (1025), B (1030), and C (1035) are also included in the manifold, making digit cluster boundaries more refined. Training in this manner results in a classifier that also has a compressed clustering manifold where known devices can be clustered. Devices that are known about during training and have labels present are called the Known Known Classes, KKCs. They act as positive training examples that we wish to accurately classify. New devices that are unknown during training and only appear during testing are called Unknown Unknown Classes, UUCs (1040). These cannot be explicitly trained for. However, additional unknown devices, Known Unknown Classes, KUCs, can be added during the training process as surrogates for the true unknowns that will be present during testing. The presence of KUCs help to refine the boundaries of KKCs and enable better detection and separation of both KKCs and UUCs during testing. However, in embodiments there is nothing to prevent new unseen classes from overlapping the locations of the known classes on the manifold.

In embodiments, the goal is to enforce clusters within the clustering manifold for known devices that are separated in the manifold from unknown, future novel devices that could present themselves during testing. To promote novel devices into new regions of the clustering manifold, a set of Known Unknown Classes, KUCs, is also used during training. This set of devices is known during training, but they aren't necessarily grouped into any meaningful classes. They can be thought of as a type of surrogate for out-of-library devices and help to encourage new devices to not overlap with known device clusters.

During training, a classifier is built using both the KKCs and KUCs, and the location of each KKC training example on the clustering manifold is identified. These locations are used to learn a cluster centroid for each of the KKCs, and the KUCs are not used during testing. The KUCs effectively constrain the cluster boundaries of the KKCs because they force the centroid covariances to be lower. This indirectly encourages potential unknown classes to be distinct from the KKCs. Thus, during testing, Unknown Unknown Classes, UUCs (1040), or novel devices, are more likely to be detected as such and not errantly classified as one of the known devices.

The computing system used for the Artificial Intelligence Radio Classifier and Identifier for performing (or controlling) the operations or functions described hereinabove with respect to the system and/or the method may include a processor, FPGA, I/O devices, a memory system, and a network adaptor. The computing system includes a program module (not shown) for performing (or controlling) the operations or functions described hereinabove with respect to the system and/or the method according to exemplary embodiments. For example, the program module may include routines, programs, objects, components, logic, data structures, or the like, for performing particular tasks or implement particular abstract data types. The processor may execute instructions written in the program module to perform (or control) the operations or functions described hereinabove with respect to the system and/or the method. The program module may be programmed into the integrated circuits of the processor. In an exemplary embodiment, the program module may be stored in the memory system or in a remote computer system storage media.

The computing system may include a variety of computing system readable media. Such media may be any available media that is accessible by the computer system, and it may include both volatile and non-volatile media, removable and non-removable media.

The memory system can include computer system readable media in the form of volatile memory, such as random access memory (RAM) and/or cache memory or others. The computer system may further include other removable/non-removable, volatile/non-volatile computer system storage media. The computer system can communicate with one or more devices using the network adapter. The network adapter may support wired communications based on Internet, LAN, WAN, or the like, or wireless communications based on CDMA, GSM, wideband CDMA, CDMA-2000, TDMA, LTE, wireless LAN, Bluetooth, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to a flowchart illustration and/or block diagram of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A system whereby individual RF emitter devices are individually identified through deep-learning comprising:
    an RF receiver for receiving RF signals from a plurality of individual RF emitter devices;
    a preprocessor configured to produce complex-valued In-phase (I) and Quadrature (Q) IQ signal sample representations from the RF signals;
    a two-stage Augmented Dilated Causal Convolution (ADCC) network comprising stacks of dilated causal convolution layers and traditional convolutional layers configured to process I and Q components of said complex IQ sample representations;
    concatenating said two-stages; and
    an output from said two concatenated stages identifying said individual RF emitter devices whereby said individual RF emitter devices are individually identified.

2. The system of claim 1 wherein said preprocessor is configured to further preprocess each said RF signal, said further preprocessing comprising:
    bandpass filtering;
    base-banding;
    normalizing said RF signals by the complex value of the sample with the largest magnitude; and
    resampling to 100 Msps.

3. The system of claim 1 comprising multi-burst wherein a plurality of signals having a same label are processed, whereby k-multi-burst predictions comprise performing inference on each of said k input signals independently, and combining their class probability vectors.

4. The system of claim 1 comprising multi-burst wherein a plurality of signals having a same label are processed, whereby k-multi-burst predictions comprise performing inference on each of said k input signals independently, and combining their class probability vectors;
    wherein k is 5.

5. The system of claim 1 comprising Merged-Averaged Classifiers via Hashing (MACH) to learn and combine multiple smaller classifiers instead of one large classifier wherein each class i is uniquely mapped into a set of buckets B<k via a hash function $h_j$, said unique class mapping is repeated R times whereby accuracy for large class problems is improved.

6. The system of claim 1 comprising at least one of:
    transfer learning comprising a classifier feature extraction, individual device detection comprising a classifier, and a cluster embedding dense layer; and
    unsupervised signal clustering from embedded learned features whereby said RF signals are grouped according to a device that transmitted said RF signal.

7. The system of claim 1 comprising receptive field sizes of a fixed 16 µs and 2.5 µs, respectively, for said two stages.

8. The system of claim 1 further comprising training using a plurality of RF emitter devices to establish a training set used by the ADCC to determine features of the individual devices.

9. The system of claim 8 wherein training of said network using a plurality of RF emitter devices comprises a training set comprising a population size of greater than 10,000 RF devices.

10. The system of claim 9 wherein, after training, feature weights and classifier weights are locked.

11. The system of claim 1, wherein said system comprises:
    a base feature extraction component;
    a classifier component;
    a decoder component;
    a clustering component; and
    a zero-shot learning component of a clustering manifold.

12. The system of claim 1 wherein said samples comprise only a first 1,600 samples or 16 microseconds of a signal, whereby ID spoofing is prevented due to said ID location in said signal after said first 16 microseconds of said signal.

13. The system of claim 1 wherein said RF signals comprise at least one of:
    Wi-Fi 802.11a signals;
    Wi-Fi 802.11g signals;
    cell phone protocol signals;

access point signals;
IoT devices;
Bluetooth transmitter signals;
extended-mode-S ADS-B transmissions from aircraft;
AIS transmissions from boats; and
radar return signals.

14. The system of claim 1 wherein the output comprises at least one of RF fingerprinting, modulation classification, device discovery, and signal clustering and separation.

15. A method for determining individual RF emitters through deep-learning comprising:
   receiving RF signals from a plurality of individual devices;
   producing complex-valued In-phase (I) and Quadrature (Q) IQ signal sample representations of said RF signals;
   processing I and Q components of said complex IQ samples in a two-stage Augmented Dilated Causal Convolution (ADCC) network comprising a stack of dilated causal convolution layers and traditional convolutional layers configured to process I and Q components of said complex IQ samples; and
   identifying, in an output, said individual RF emitter device whereby said individual RF emitter device is distinguished in a non-test environment.

16. The method of claim 15 wherein said ADCC comprises a Gated Dilated Causal Convolutional (GDCC) operation is defined as:

$$z_i = \tanh(W_{f,i} * x_i) \odot \sigma(W_{g,i} * x_i)$$

where $W_{f,i}$ is a filter kernel for block i, $x_i$ is an input to block i, $W_{g,i}$ is a gate kernel for block i, * is a convolution operation,
⊙ is an element wise multiplication operation, and σ is a sigmoid function.

17. The method of claim 15 wherein said stack of dilated causal convolution (DCC) layers of said method comprises a receptive field $r_i$ of a skip connection of residual block i related to a receptive field of residual block i−1, and a dilation rate ($d_i$) and kernel size ($k_i$) of block i by:

$$r_i = r_{i-1} + (k_i - 1)d_i.$$

18. The method of claim 15 wherein a coverage factor c for a residual block i of said stack of dilated causal convolution layers is computed recursively by:

$$c_i = \begin{cases} c_{i-1}, & d_i \leq r_i \\ c_{i-1}\left(1 - \frac{(k_i-1)(d_i - r_{i-1})}{r_i}\right), & d_i > r_{i-1} \end{cases}$$

where $k_i$ is a kernel size, $d_i$ is a dilation rate, and $r_i$ is a receptive field.

19. The method of claim 15 comprising clustering, wherein said clustering comprises:
   a clustering algorithm input that is a point-wise complex magnitude of said RF signals given by:

$$\{z_i\}_{i=1}^{N} = \{\vec{z}_1, \vec{z}_2, \ldots, \vec{z}_N\}$$

where $z_i \in C^T$ are complex-valued signals of length T, and N is a number of said RF signals processed.

20. A non-transitory computer readable medium, having stored thereon, instructions that when executed by a computing device, cause the computing device to perform an individual RF emitter determination through deep-learning method operations comprising:
   receiving RF signals from a plurality of individual devices;
   producing complex-valued In-phase (I) and Quadrature (Q) IQ signal sample representations of said RF signals;
   processing I and Q components of said complex IQ samples in a two-stage Augmented Dilated Causal Convolution (ADCC) network comprising a stack of dilated causal convolution layers and traditional convolutional layers configured to process I and Q components of said complex IQ samples;
   performing transfer learning comprising a classifier and a cluster embedding dense layer;
   performing unsupervised clustering whereby said RF signals are grouped according to a device that transmitted said RF signal;
   performing an individual device detection zeroshot process; and
   identifying, in an output, said individual RF emitter device whereby said individual RF emitter device is distinguished in a non-test environment.

* * * * *